Figure 1:
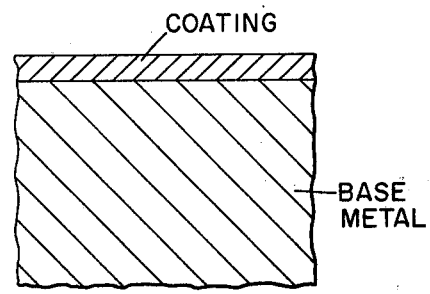

United States Patent [19]

Greenfield et al.

[11] 4,168,183

[45] Sep. 18, 1979

[54] PROCESS FOR IMPROVING THE FATIGUE PROPERTIES OF STRUCTURES OR OBJECTS

[75] Inventors: Irwin G. Greenfield, Newark, Del.; Ankur V. Purhoit, Lisle, Ill.

[73] Assignee: University of Delaware, Newark, Del.

[21] Appl. No.: 918,481

[22] Filed: Jun. 23, 1978

[51] Int. Cl.² .............................................. C22F 1/00
[52] U.S. Cl. .................................. 148/4; 148/11.5 R; 148/31.5; 148/127; 148/131
[58] Field of Search ...................... 148/31.5, 32.5, 152, 148/133, 131, 130, 127, 13 R, 12.9, 11.5 Q, 13.1, 1, 4

[56] References Cited

U.S. PATENT DOCUMENTS

| | | | |
|---|---|---|---|
| 2,739,907 | 3/1956 | Nowak | 148/12.9 |
| 3,477,884 | 11/1969 | Schlicht | 148/152 |
| 3,505,130 | 4/1970 | Paul | 148/39 |
| 3,528,861 | 9/1970 | Elan et al. | 148/11.5 Q |
| 3,537,913 | 11/1970 | Klisowski | 148/131 |
| 3,691,029 | 9/1972 | Raymond et al. | 148/31.5 |
| 3,779,719 | 12/1973 | Clark et al. | 148/127 |
| 3,988,955 | 11/1976 | Engel et al. | 148/31.5 |

OTHER PUBLICATIONS

DeGarmo, Materials and Processes in Manufacturing, 4th ed., MacMillan Publishing Co., Inc., N.Y., 1974, pp. 48, 49.

*Primary Examiner*—L. Dewayne Rutledge
*Assistant Examiner*—Peter K. Skiff

[57] ABSTRACT

This is a process for improving the fatigue properties of structures which have dislocations or deformed regions in the surface layers. Solute is diffused into this surface region and inhibits the atomic movements which lead to initiation and growth of fatigue cracks. The deformed regions can be produced by pre-cyclic straining of the structures. The process is applicable to metals and crystallographic mterial that are susceptible to fatigue failure. Moreover, cyclic straining of polymers and glasses will produce defect structures in the surface layers and solute diffused, as in the case of above, will also impede further development of defects and reduce the susceptibility of the structure or object of fatigue failure.

3 Claims, 3 Drawing Figures

BASE METAL COATED

CYCLIC PRESTRAINING

AFTER DIFFUSION TREATMENT

PROCESS FOR IMPROVING THE FATIGUE PROPERTIES OF STRUCTURES OR OBJECTS

The Government has rights in this invention pursuant to Grant AFOSR 71-2094 awarded by the Department of the Air Force.

This invention relates to the improvement of fatigue life of materials by treating the surface and sub-surface layers.

There are a number of surface treatments in the prior art that are employed to improve the fatigue properties of materials:

a. Shot peening—This method is based on producing a compressive stress layer on the surface by mechanical deformation by metal or glass shot.

b. Plating-coating with harder metals has also been successfully used; a process such as chromizing where chromium is deposited as a surface layer is an example of this category.

c. Diffusion treatments—diffusion layers of carbon or nitrogen in steel (carburizing or nitriding) can have a marked improvement in fatigue characteristics of the metal.

Many of the surface treatment methods are specific to certain metals. For example, carburizing and nitriding are useful only for body-centered cubic metals; the improvement in fatigue is most noteworthy with iron. Hard coatings produced electrolytically or by other deposition methods are affected by impurities and the cleanliness of the base metal surface. If the coatings are not continuous, the fatigue properties of the base metal can be degraded. The material chosen for the coating must be compatible to base material or adherence will be poor; or, if the coating is brittle, the fatigue life may decrease. Shot peening destroys the surface finish and can affect the dimensions of the object.

Although these methods are satisfactory for certain materials, it is the object of this invention to selectively strengthen the regions which are stressed the greatest amount by providing a new treatment that strengthens surface layers and impedes the atomic processes leading to crack nucleation and growth.

This object is accomplished by a process which comprises diffusing a solute along the lines of the dislocations or through regions of disorder in the surface of a structure or object. The dislocations or region of disorder are created by cyclic straining and the solute that is diffused into the surface layer is capable of hardening the surface layer.

The process of this invention is useful in improving the fatigue properties of metals and alloys presently being used in cyclically stressed structures, as well as with glasses, ceramics, polymers, and other solid materials.

The process is based on the technique of forming near the surface of the structure or object a thin diffusion layer which impedes the movement of atoms during cyclic straining and prevents the development of fatigue cracks.

In its preferred embodiment, where the structure or object has not yet been subjected to cyclic straining during use, the process of this invention involved the following three steps:

(1) coating a part of the object or structure with an appropriate material that will diffuse into the surface layer when annealed;

(2) cyclically straining the part a desired number of cycles at the desired stress level; and (3) annealing the part to create a thin diffusion layer near the surface.

These three steps, coating, cyclic prestraining and diffusion annealing are more fully described as follows:

Coating: Any conventional coating method can be used as long as adhesion to the surface is achieved. The coating can be applied to the surface of the object by one or a combination of methods such as electroplating, chemical ion exchange, diffusion treatment by direct contact with solid, liquid or gaseous phases, sputter deposition, vapor deposition in vacuum environment and flame spraying to provide a surface coating as shown in FIG. 1. Some discontinuities are acceptable at the interface since the final diffusion treatment will reduce these irregularities.

Cyclic Prestraining: The coated part is deformed cyclically at a strain amplitude of a higher magnitude than the part would normally encounter in service. The number of cycles depends upon the degree of cyclic hardening desired. In general, the intensity of the cyclic deformation should be near the fatigue hardening saturation state in metals; high densities of dislocations will be formed in regions shown in FIG. 2. The amount of cyclic deformation for the prestraining should be less than the number of cycles associated with saturation and should not be larger than the number of cycles which produces microcracks on the surface.

Diffusion Treatment: After the desired cyclic prestraining, a diffusion annealing treatment is carried out in which the coating is diffused a short distance into the surface layers. The time, temperature and atmosphere of this treatment is dependent upon the material system being used. The annealing treatment, however, is conducted under conditions at which no recrystallization of the material of the object or structure or elimination of the majority of the dislocations or deformation produced by the cyclic prestraining takes place. This diffusion treatment produces the product as shown in FIG. 3.

Figure 2:
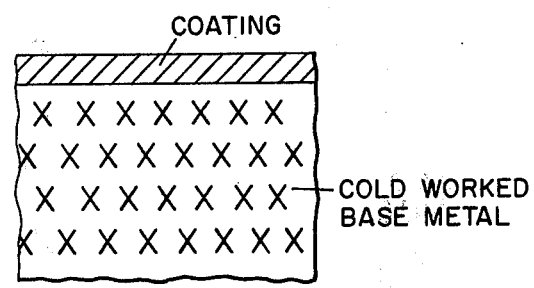
Figure 3:
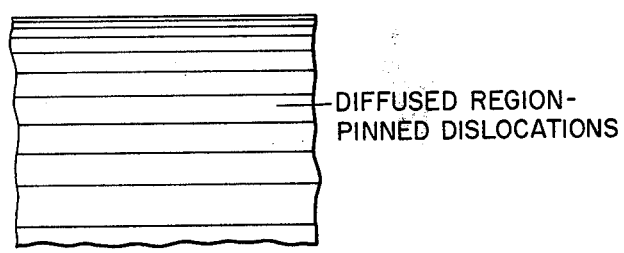

FIGS. 1, 2, and 3 are enlarged cross sectional views of the surface layer of the material treated to a depth of one to ten microns.

The major effect from the treatment described is the impedance of the atomic rearrangements near the surface during cycling deformation. Essentially, the changes due to the treatment prevent multiplication of dislocations near the surface or the movement of molecules near the surface. To develop this static condition in the surface layer, two important material characteristics are necessary:

(1) during cyclic prestraining, dislocations or deformed regions must develop in the surface layers as well as the bulk and (2) a satisfactory solute is present which will diffuse along the dislocations and effectively pin them so that during subsequent cyclic straining the dislocations then will act as barriers to dislocation multiplication and the fatigue-crack nucleation process, or a satisfactory solute is present that will diffuse among the disordered molecules and pin them from moving. The solute is derived from the coating and moves to the dislocations or to the disordered molecules during the diffusion annealing treatment.

Although an annealing treatment is part of this method, the temperature is low enough so that structural changes of the bulk material are minimal. This technique can be applied to a structure which has been in service for a time; and in fact, the region which has been strained the greatest during the cycling will be most susceptible to this method of strengthening. Since there is no change chemically or physically in the bulk material, the static mechanical and physical properties are not altered. This technique minimizes the expensive processes of alloy development and allows one to "engineer" a metal for a specific purpose.

A unique feature of this invention is the cyclic prestraining of the part of the material or structure prior to it being put into use. This feature of cyclic prestraining followed by the diffusion treatment greatly increases the life of the material or structure as shown in the examples.

EXAMPLE 1.

A copper specimen, ¼ inch in diameter, with polished surface was subjected to pulsating tensile fatigue tests in a closed loop fatigue teating machine. The average stress was 946 kg/cm$^2$ and the amplitude of the cyclic stress was 630 kg/cm$^2$. The forcing function was sinusoidal with a frequency of about 20 hz. The copper specimen without any surface treatment was found to fail after $0.82 \times 10^6$ cycles. Identical specimens were electroplated with 0.3 microns of zinc and annealed 90 minutes at 270° C. Fatigue testing resulted in a lifetime of $3.4 \times 10^6$ cycles. A third group of specimens were electroplated as above and prestrained by $1.5 \times 10^4$ cycles, before being diffusion annealed by 270° C. The fatigue lifetime was increased more than an order of magnitude to $4.3 \times 10^7$ cycles.

This process can be used with other materials. In particular for ferritic iron alloys such as AISI 430, AISI 446, stainless W 17-4PH and 17-7PH, chromium can be used as a coating material. The diffusion temperature should be about 400° C. These alloys have high dislocation pipe diffusion rates. Moreover, the addition of chromium will enhance oxidation resistance and ferrite stabilization.

The fatigue lifetimes of austenitic iron alloys AISI 201, 202 and 301 can be improved by a diffused layer of nickel. The nickel can be initially added to the surface by ion implantation to avoid sulphates in the coating. The nickel will also act as an austenitic stabilizer, in addition to limiting the dislocation movement near the surface.

Nickel alloys in the Inconel and Incology series can be treated with chromium, titanium or tungsten. These materials are soluble in nickel and should act to pin dislocations and delay the initiation of fatigue cracking. Copper, cobalt and aluminum will reduce the stacking fault energy of the alloy near the surface. Reduction of stacking fault energy is associated with longer fatigue lifetimes.

Other solutes than zinc can be employed with pure copper, deoxidized copper and tough pitch copper. Aluminum, gold, silver, tin, berylium, nickel, oxygen, platinum, and palladium are soluble to some extent in copper and will tend to impede the movement of the dislocations.

Small amounts of oxygen in the surface of titanium will produce a hardened layer. This layer will improve the fatigue properties of certain titanium alloys.

Any substance that reduces the propensity of plastic deformation in the surface layers in polymers, glasses and ceramics, can be diffused into the surface of objects or structures. This treatment will inhibit the initiation of cracks.

The fatigue prestraining step may occur before coating with the diffusion material as well as after such coating.

In this invention only a thin layer of the surface is affected and the bulk properties are not altered, thus, fatigue improvement is possible without altering the important bulk properties such as electrical resistivity, tensile strength, ductility, magnetic properties, etc.

The problem of fatigue failure is an important limitation to the design of dynamics systems. Although other strength criteria such as yield and tensile strength can be satisfied in dynamically loaded systems, the lifetime of the part may be dependent upon the fatigue life. Often the correction of a fatigue problem leads to an increase in weight of the part, and for most dynamic systems, an increase in weight is detrimental. This method offers to increase the fatigue lifetime without re-development of the existing alloys and metals.

The treatment can be applied before the part is used in service or after a given amount of service use. With the latter method, those regions which have developed the most fatigue damage, such as high stress regions would be most improved by the diffusion annealing treatment. Other benefits from the surface treatment is improved wear, erosion and corrosion properties are attainable.

While particular examples of the present invention have been shown and described, it is apparent that changes and modification may be made therein without departing from the invention in its broader aspects. The aim of the appended claims, therefore, is to cover all such changes and modifications as fall with the true spirit and scope of the invention.

We claim:

1. A process for improving the fatigue properties of structures and objects having dislocations or disorder structure in the surface layers due to plastic deformation from cyclic straining, which is comprised of several steps, (1) coating with a material that contains a solute, (2) cyclically prestraining to create dislocations or a disordered region in said surface layer and (3) thereafter annealing at the proper temperature to diffuse said solute into the deformed surface layer in order to harden said surface layer of said structure or object and to prevent atomic movement in the surface layer during subsequent cyclic straining.

2. The process of claim 1 wherein the structure or object is subjected to cyclic prestraining before the coating is applied.

3. The process of claim 2 wherein the structure or object has been removed from service before treatment.